United States Patent
Yamaguchi et al.

(10) Patent No.: US 9,840,210 B2
(45) Date of Patent: Dec. 12, 2017

(54) WIRE HARNESS

(71) Applicants: YAZAKI CORPORATION, Tokyo (JP); TOYOTA JIDOSHA KABUSHIKI KAISHA, Toyota-shi, Aichi-ken (JP)

(72) Inventors: Yasuhiro Yamaguchi, Kakegawa (JP); Yoshitaka Ohkubo, Kakegawa (JP); Hajime Kato, Kakegawa (JP); Hiroshi Aihara, Toyota (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/176,263

(22) Filed: Jun. 8, 2016

(65) Prior Publication Data

US 2016/0362073 A1 Dec. 15, 2016

(30) Foreign Application Priority Data

Jun. 12, 2015 (JP) .................................. 2015-119640

(51) Int. Cl.
*H01B 7/00* (2006.01)
*B60R 16/02* (2006.01)
*H01B 9/02* (2006.01)

(52) U.S. Cl.
CPC ............ *B60R 16/0207* (2013.01); *H01B 9/02* (2013.01); *H01B 9/028* (2013.01)

(58) Field of Classification Search
CPC ... H01B 7/02; H01B 7/17; H01B 7/20; H01B 9/02; H01B 9/028; H02G 3/04
USPC ......... 174/102 R, 103, 106 R, 110 R, 113 R, 174/117 R, 117 F, 117 FF
See application file for complete search history.

(56) References Cited

U.S. PATENT DOCUMENTS 6,160,216 A * 12/2000 McMahon ........... H01B 7/0045
174/102 R
9,586,539 B2 * 3/2017 Yamada .............. B60R 16/0215
(Continued)

FOREIGN PATENT DOCUMENTS

JP 59109019 U 7/1984
JP 2001-136632 A * 5/2001 ............... H02G 3/04
(Continued)

OTHER PUBLICATIONS

Communication dated Jun. 27, 2017, from the Japanese Patent Office in counterpart application No. 2015-119640.

*Primary Examiner* — William H Mayo, III
(74) *Attorney, Agent, or Firm* — Sughrue Mion, PLLC

(57) ABSTRACT

A wire harness includes a wire portion formed by arranging three wires in the same direction, the respective wires having conductors and insulators coating outer circumferences of the conductors, and a braided wire. The three wires of the wire portion and the braided wire are disposed such that the braided wire is interposed between two wires of the wire portion adjacent to each other along a circumferential direction around a central axial line of the wire portion on a cross section of the wire harness when viewed from an axial direction along the central axial line, on a side of the central axial line from outer circumferential-side tangents connecting the conductors of the two wires.

11 Claims, 3 Drawing Sheets

(56) References Cited

U.S. PATENT DOCUMENTS

| | | | | |
|---|---|---|---|---|
| 2002/0062979 | A1* | 5/2002 | Murakami | H01B 7/0861 174/117 F |
| 2005/0006127 | A1* | 1/2005 | Shimura | H01R 13/648 174/72 A |
| 2011/0088944 | A1* | 4/2011 | Ogue | B60R 16/0215 174/72 A |
| 2011/0127084 | A1* | 6/2011 | Ichikawa | B60R 16/0215 174/72 A |
| 2012/0305308 | A1* | 12/2012 | Toyama | B60R 16/0207 174/70 R |
| 2012/0312597 | A1* | 12/2012 | Toyama | H01R 4/182 174/84 C |
| 2013/0092434 | A1* | 4/2013 | Kato | B60R 16/0215 174/72 A |
| 2013/0306344 | A1* | 11/2013 | Toyama | H01B 7/0081 174/68.2 |
| 2014/0144696 | A1* | 5/2014 | Nagahashi | B60R 16/0215 174/70 R |
| 2014/0251681 | A1* | 9/2014 | Adachi | B29C 63/42 174/72 A |
| 2014/0284100 | A1* | 9/2014 | Ichikawa | B60R 16/0215 174/70 R |
| 2014/0360771 | A1* | 12/2014 | Itani | H05K 9/0098 174/354 |
| 2015/0155638 | A1* | 6/2015 | Nagahashi | H01R 4/203 174/74 R |
| 2015/0366111 | A1 | 12/2015 | Yagi | |

FOREIGN PATENT DOCUMENTS

| | | | | |
|---|---|---|---|---|
| JP | 2006-269201 A | | 10/2006 | |
| JP | 2012-134367 A | * | 7/2012 | H01B 7/17 |
| JP | 2012-249506 A | * | 12/2012 | H02G 3/04 |
| JP | 2013-093144 A | | 5/2013 | |
| WO | WO2014/208263 A1 | * | 12/2014 | H01B 7/00 |

\* cited by examiner

US 9,840,210 B2

WIRE HARNESS

CROSS-REFERENCE TO RELATED APPLICATION(S)

The present application claims priority to and incorporates by reference the entire contents of Japanese Patent Application No. 2015-119640 filed in Japan on Jun. 12, 2015.

BACKGROUND OF THE INVENTION

1. Field of the Invention

The present invention relates to a wire harness.

2. Description of the Related Art

In a conventional vehicle such as a hybrid vehicle and an electric vehicle, an inverter and a motor have been connected to each other through a three-phase wire, and power has been supplied from the inverter to the motor. Referring to the three-phase wire, a structure for suppressing noise by collectively covering an outer circumferential portion with one braid (so-called collective shield structure) is known (for example, see Japanese Patent Application Laid-open No. 2012-249506).

Incidentally, when power is supplied from an inverter to a motor, an output from the inverter contains a steeply rising voltage. This steeply rising voltage is repeatedly reflected many times between the inverter and the motor due to an impedance mismatch. As a result, an excessive surge voltage may be applied to the motor. In a conventional collective shield structure disclosed in Japanese Patent Application Laid-open No. 2012-249506 and the like, there has been further room for improvement in suppressing a surge voltage.

SUMMARY OF THE INVENTION

The present invention has been conceived in view of the above description, and an object of the present invention is to provide a wire harness capable of suitably suppressing a surge voltage.

In order to achieve the above mentioned object, a wire harness according to one aspect of the present invention includes a wire portion formed by arranging three or more wires in the same direction, each of the wires having a conductor and an insulator coating an outer circumference of the conductor; and a shield member, wherein the three or more wires of the wire portion and the shield member are disposed such that the shield member is interposed between two wires of the wire portion adjacent to each other along a circumferential direction around a central axial line of the wire portion on a cross section of the wire harness when viewed from an axial direction along the central axial line, on a side of the central axial line from an outer circumferential-side tangent connecting the conductors of the two wires.

According to another aspect of the present invention, in the wire harness, it is preferable that the shield member is a braided wire formed by weaving a metal thin wire in a mesh shape.

According to still another aspect of the present invention, in the wire harness, it is preferable that the shield member is grounded.

According to still another aspect of the present invention, in the wire harness, it is preferable that the wires of the wire portion have circular shapes on the cross section and are evenly disposed along the circumferential direction, and the shield member is formed to collectively surround an outer circumferential side of the wire portion on the cross section, and approach the side of the central axial line from a segment connecting center of gravity points of two wires of the wire portion adjacent to each other in the circumferential direction between the two wires.

According to still another aspect of the present invention, in the wire harness, it is preferable that the shield member is formed to approach up to the central axial line from between the two wires on the cross section, and surround respective outer circumferential sides of the wires of the wire portion.

According to still another aspect of the present invention, in the wire harness, it is preferable that the wires of the wire portion have rectangular shapes on the cross section, the wires being disposed such that long sides of the rectangular shapes extend outward from the central axial line and being evenly disposed along the circumferential direction, and the shield member is formed to collectively surround an outer circumferential side of the wire portion on the cross section, and is formed along an outer short side corresponding to one of two short sides of the rectangular shape of each of the wires and two long sides of the rectangular shape.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
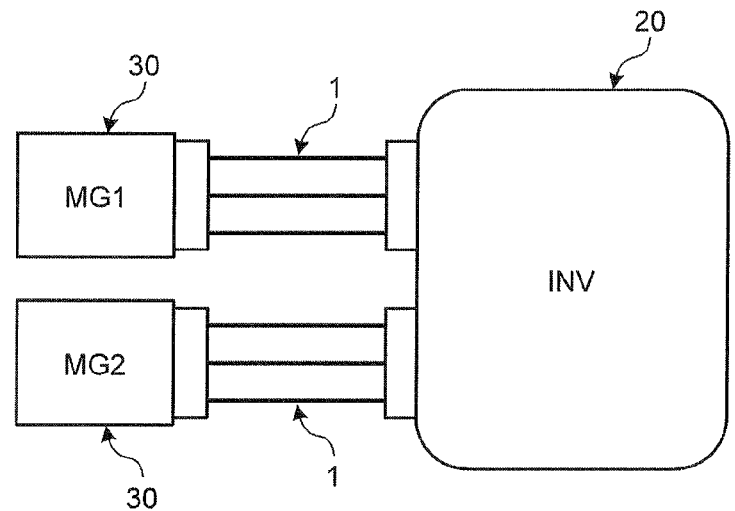
FIG. 1 is a schematic diagram illustrating a configuration for connecting a motor and an inverter by a wire harness according to a first embodiment of the present invention.

Hereinafter, a description will be given of embodiments of a wire harness according to the present invention based on drawings. In the drawings below, the same reference numeral is applied to the same or corresponding portion, and a repeated description thereof will not be given.

First Embodiment

Figure 2:
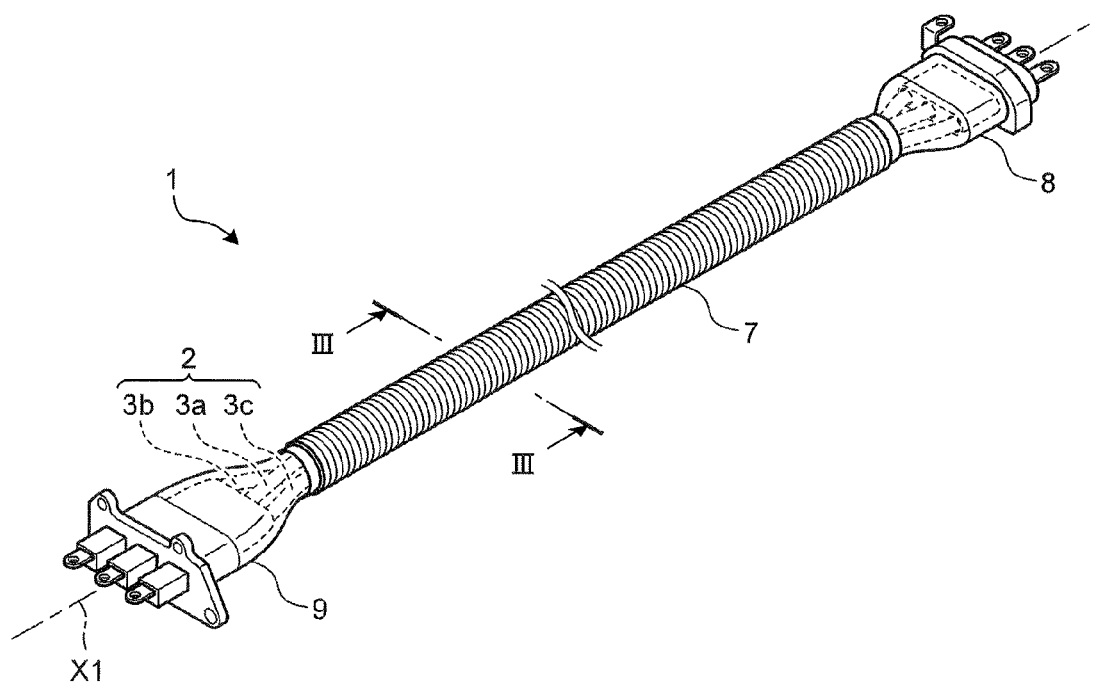
FIG. 2 is a perspective view of the wire harness according to the first embodiment.
Figure 3:
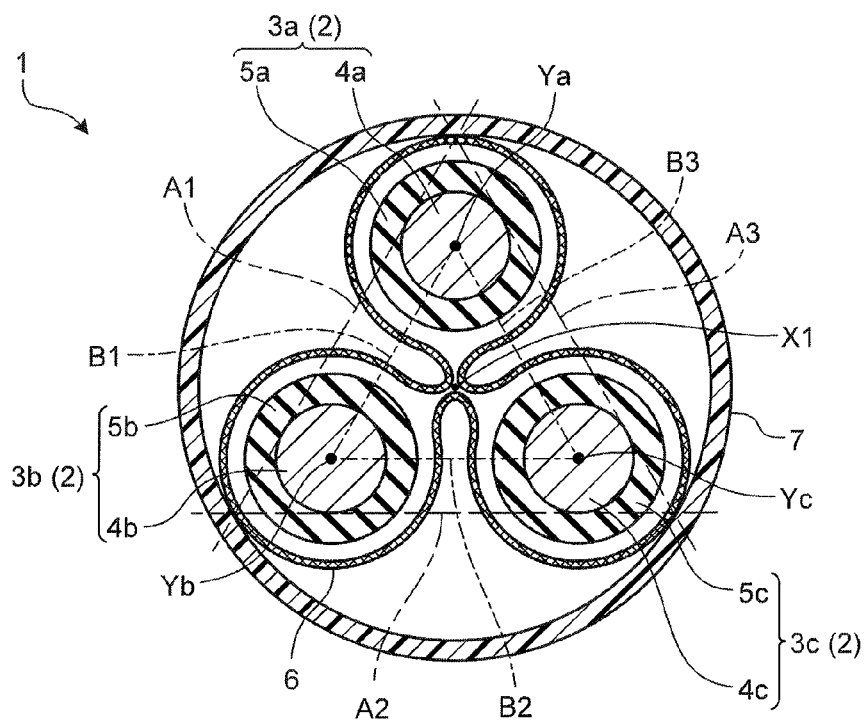
FIG. 3 is a cross-sectional view taken along line III-III of FIG. 2, and is an axial sectional view of the wire harness according to the first embodiment.

A description will be given of a first embodiment with reference to FIGS. 1 to 3. FIG. 1 is a schematic diagram illustrating a configuration for connecting a motor and an inverter by a wire harness according to a first embodiment of the present invention. FIG. 2 is a perspective view of the wire harness according to the first embodiment. FIG. 3 is a cross-sectional view taken along line of FIG. 2, and is an axial sectional view of the wire harness according to the first embodiment.

An inverter 20 ("INV" of FIG. 1) and a motor 30 ("MG1" and "MG2" of FIG. 1) illustrated in FIG. 1 are installed in a vehicle such as a hybrid vehicle and an electric vehicle.

The inverter 20 is a device for converting a direct current (DC) output from a power source (not illustrated) installed in the vehicle into a three-phase alternating current (AC) output. The inverter 20 may output a pulse width modulation (PWM) waveform, and may output a sine waveform. The motor 30 is a device driven by the three-phase AC output, which is output from the inverter 20. For example, the motor 30 is a three-phase motor having star connection.

A wire harness 1 according to the present embodiment is used as a power supply line that connects the inverter 20 and the motor 30 corresponding to the above-described three-phase AC type. The wire harness 1 is a three-phase wire including a three-phase and three-line type wire group that supplies three-phase AC power using three wires 3a, 3b, and 3c (see FIGS. 2 and 3).

As illustrated in FIGS. 2 and 3, referring to the wire harness 1, an inverter-side connector 8 and a motor-side connector 9 for connecting the inverter 20 and the motor 30, respectively, are connected to both terminals of a wire portion 2, in which the three wires 3a, 3b, and 3c are arranged in the same direction, and an outer circumferential side of the wire portion 2 is coated with a tubular braided wire 6 (shield member) and a corrugated tube 7.

The three wires 3a, 3b, and 3c of the wire portion 2 extend along a predetermined central axial line X1, and are evenly disposed along a circumferential direction around the central axial line X1. The three respective wires 3a, 3b, and 3c correspond to unshielded wires and include conductors 4a, 4b, and 4c having circular shapes on a cross section and insulators 5a, 5b, and 5c formed by coating outer circumferences of the conductors 4a, 4b, and 4c. In other words, the wires 3a, 3b, and 3c have substantially circular shapes on a cross section (cross section in an axial direction) of the wire harness 1 when viewed from the axial direction along the central axial line X1 illustrated in FIG. 3. For example, the conductors 4a, 4b, and 4c of the wires 3a, 3b, and 3c include stranded wires formed by twisting a plurality of element wires made of metal (for example, an aluminum alloy, a copper alloy, and the like) together in spiral shapes, rod-shaped single-core wires, etc. For example, the insulators 5a, 5b, and 5c of the wires 3a, 3b, and 3c are formed by synthetic resin.

The respective wires 3a, 3b, and 3c of the wire portion 2 are disposed such that respective central axes (center of gravity points) Ya, Yb, and Yc thereof substantially form a regular triangle on the cross section in the axial direction illustrated in FIG. 3 to have a so-called trefoil-shaped disposition. In addition, the three wires 3a, 3b, and 3c are disposed such that two wires adjacent to each other in the circumferential direction around the central axial line X1 have a gap therebetween without touching each other. All the conductors 4a, 4b, and 4c and the insulators 5a, 5b, and 5c of the respective wires 3a, 3b, and 3c have plasticity, and thus the wire portion 2 can be bent and deformed.

The braided wire 6 is formed by weaving an element wire made of metal (for example, made of copper metal) in a mesh shape to have a tubular shape as a whole. The braided wire 6 functions as a shield member that suppresses noise by collectively surrounding the outer circumferential side of the wire portion 2. The braided wire 6 can be stretched due to plasticity of the element wire, and can be freely bent and deformed together with the wire portion 2. In addition, the braided wire 6 is grounded.

The corrugated tube 7 is made of synthetic resin. For example, the corrugated tube 7 is formed in a shape of a cornice. In this way, the corrugated tube 7 can be freely elastically deformed, and can favorably maintain a cylindrical shape by an elastic restoring force. The corrugated tube 7 is formed such that the wire portion 2 coated with the braided wire 6 is accommodated inside the cylindrical shape. In this way, the outer circumferential side of the wire portion 2 may be coated to protect the wires.

In particular, in the present embodiment, as illustrated in FIG. 3, there is a characteristic in a coated form of the braided wire 6 with respect to the three wires 3a, 3b, and 3c of the wire portion 2. In the wire harness 1 of the present embodiment, the three wires 3a, 3b, and 3c of the wire portion 2 and the braided wire 6 are alternately disposed along the circumferential direction around the central axial line X1 of the wire portion 2. In other words, the braided wire 6 is interposed between two wires adjacent to each other in the circumferential direction in the three wires 3a, 3b, and 3c evenly disposed along the circumferential direction around the central axial line X1. That is, the braided wire 6 is sandwiched between two wires adjacent to each other in the circumferential direction among the three wires 3a, 3b, and 3c of the wire portion 2.

More specifically, as illustrated in FIG. 3, on the cross section of the wire harness 1 when viewed from the axial direction along the central axial line X1, (1) the outer circumferential side of the wire portion 2 is collectively surrounded, and (2) the three wires 3a, 3b, and 3c of the wire portion 2 and the braided wire 6 are disposed such that the braided wire 6 is interposed between two wires of the wire portion 2 adjacent to each other along the circumferential direction around the central axial line X1 of the wire portion 2 on a side of the central axial line X1 from an outer circumferential-side tangent that connects conductors of the two wires. The item (2) is described in detail below. The braided wire 6 approaches the side of the central axial line X1 from an outer circumferential-side tangent A1 that touches the conductor 4a of the wire 3a and the conductor 4b of the wire 3b at the same time from the outer circumferential side between the wire 3a and the wire 3b of the wire portion 2 adjacent to each other in the circumferential direction. Similarly, the braided wire 6 approaches the side of the central axial line X1 from an outer circumferential-side tangent A2 that touches the conductor 4b of the wire 3b and the conductor 4c of the wire 3c at the same time from the outer circumferential side between the wire 3b and the wire 3c of the wire portion 2 adjacent to each other in the circumferential direction. Similarly, the braided wire 6 approaches the side of the central axial line X1 from an outer circumferential-side tangent A3 that touches the conductor 4c of the wire 3c and the conductor 4a of the wire 3a at the same time from the outer circumferential side between the wire 3c and the wire 3a of the wire portion 2 adjacent to each other in the circumferential direction.

Figure 4:
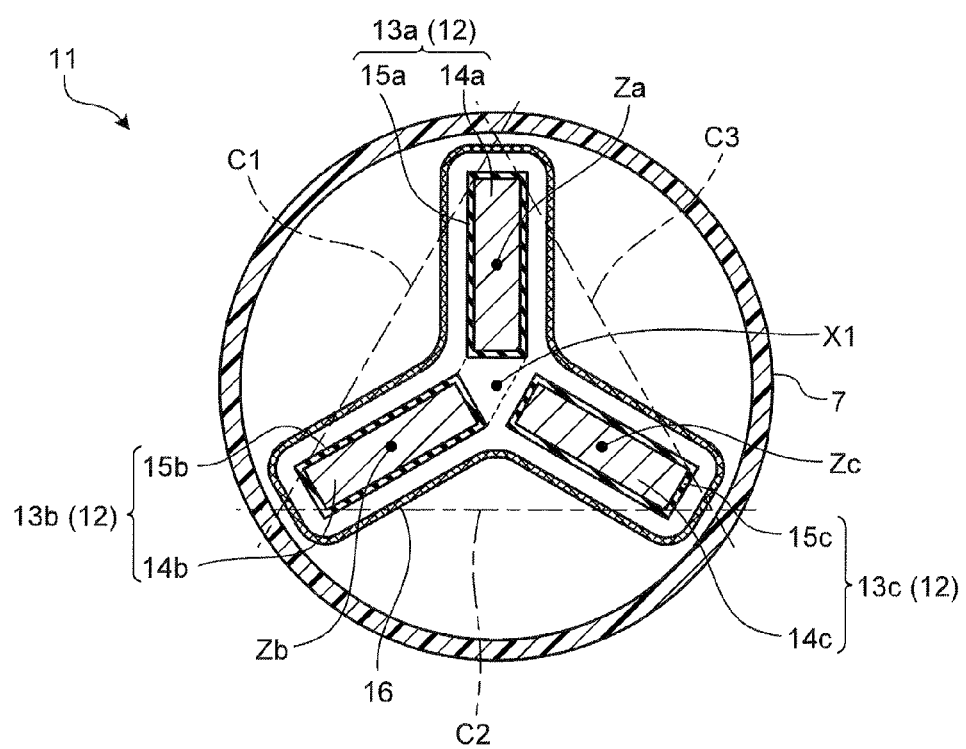
FIG. 4 is an axial sectional view of a wire harness according to a second embodiment.

Moreover, on the cross section of the wire harness 1 illustrated in FIG. 3, the braided wire 6 is formed to (1) collectively surround the outer circumferential side of the wire portion 2, and (3) approach the side of the central axial line X1 from a segment connecting center of gravity points of two wires adjacent to each other in the circumferential direction between the two wires. The item (3) is described in detail below. The braided wire 6 approaches the side of the central axial line X1 from a segment B1 connecting a center of gravity point Ya of the wire 3a and a center of gravity point Yb of the wire 3b between the wire 3a and the wire 3b adjacent to each other in the circumferential direction. Similarly, the braided wire 6 approaches the side of the central axial line X1 from a segment B2 connecting a center of gravity point Yb of the wire 3b and a center of gravity point Yc of the wire 3c between the wire 3b and the wire 3c adjacent to each other in the circumferential direction. Similarly, the braided wire 6 approaches the side of the central axial line X1 from a segment B3 connecting a center of gravity point Yc of the wire 3c and a center of gravity point Ya of the wire 3a between the wire 3c and the wire 3a adjacent to each other in the circumferential direction. In this connection, center of gravity points Za, Zb and Zc are depicted in FIG. 4.

Moreover, on the cross section of the wire harness 1 illustrated in FIG. 3, the braided wire 6 is formed to approaches up to the central axial line X1 from between two wires of the wire portion 2 adjacent to each other in the circumferential direction, and surround outer circumferential sides of the respective wires 3a, 3b, and 3c of the wire portion 2.

Next, a description will be given of effects of the wire harness 1 according to the first embodiment.

Figure 5:
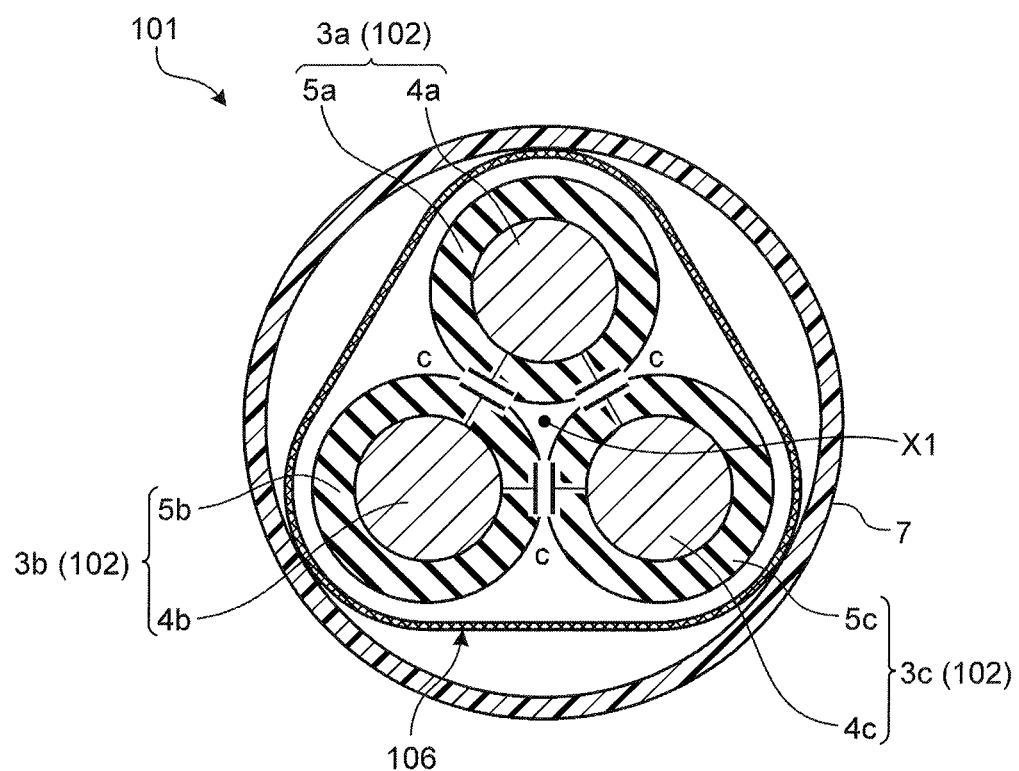
FIG. 5 is an axial sectional view of a conventional wire harness for explaining a collective shield structure of the wire harness.

Herein, a description will be given of a collective shield structure of a conventional wire harness 101 as a comparative example with reference to FIG. 5. FIG. 5 is an axial sectional view of the wire harness for explaining the collective shield structure of the conventional wire harness.

As illustrated in FIG. 5, similarly to the wire harness 1 of the present embodiment, the conventional wire harness 101 includes a wire portion 102, a braided wire 106, and a corrugated tube 7.

The wire portion 102 includes three wires 3a, 3b, and 3c similarly to the wire portion 2 of the wire harness 1 of the present embodiment. The wires 3a, 3b, and 3c are disposed in a shape of a trefoil on an axial cross section illustrated in FIG. 5. In addition, referring to the wires 3a, 3b, and 3c, two wires adjacent to each other in a circumferential direction around a central axial line X1 can touch each other. Materials, properties, and the like of conductors 4a, 4b, and 4c and insulators 5a, 5b, and 5c included in the wires 3a, 3b, and 3c are similar to those of the wire harness 1 of the present embodiment.

The braided wire 106 is formed in a tubular shape and to be similar in material and property to the braided wire 6 of the wire harness 1 of the present embodiment. In addition, the braided wire 106 collectively surrounds an outer circumferential side of the wire portion 102 similarly to the braided wire 6. Meanwhile, as illustrated in FIG. 5, the braided wire 106 is different from the braided wire 6 of the wire harness 1 of the present embodiment in that the braided wire 6 does not enter between two adjacent wires of the wire portion 102.

Since a distance between wires in the respective wires 3a, 3b, and 3c of the wire portion 102 is small, when the wire harness 101 is connected between the inverter 20 and the motor 30 to supply power (see FIG. 1), capacitances c among the respective wires 3a, 3b, and 3c increase, and noise is easily generated in the respective wires 3a, 3b, and 3c. In addition, since the respective wires 3a, 3b, and 3c are close to one another, each of the wires 3a, 3b, and 3c is easily affected by noise generated in another adjacent wire. For this reason, when noise is generated in the respective wires 3a, 3b, and 3c, radiated noise of the wire portion 102 is prone to increase. As a result, an excessive surge voltage may be generated.

On the other hand, the wire harness 1 according to the first embodiment includes the braided wire 6 and the wire portion 2 in which the three wires 3a, 3b, and 3c are arranged in the same direction. Here, the three wires 3a, 3b, and 3c include the conductors 4a, 4b, and 4c and the insulators 5a, 5b, and 5c that coat outer circumferences of the conductors 4a, 4b, and 4c, respectively. In addition, as illustrated on the axial cross section of FIG. 3, the three wires 3a, 3b, and 3c of the wire portion 2 and the braided wire 6 are disposed such that the braided wire 6 is interposed between two wires of the wire portion 2 adjacent to each other along the circumferential direction around the central axial line X1 of the wire portion 2 on the cross section of the wire harness 1 when viewed from the axial direction along the central axial line X1 of the wire portion 2 on the side of the central axial line X1 from the outer circumferential-side tangents A1, A2, and A3 connecting conductors 4a, 4b, and 4c of the two wires.

According to this configuration (configuration of the item (2)), when the braided wire 6 is interposed between two wires adjacent to each other in the circumferential direction among the wires 3a, 3b, and 3c of the wire portion 2 at all times, at least a part of a portion in which the wires directly face each other can be shielded by the braided wire 6. Therefore, it is possible to reduce the capacitances c among the respective wires 3a, 3b, and 3c of the wire portion 2, to suppress occurrence of noise of the respective wires 3a, 3b, and 3c, and to reduce influence of noise generated in another adjacent wire. In addition, there is need to provide a gap between wires adjacent to each other in the circumferential direction to obtain a configuration in which the braided wire 6 is sandwiched between the respective wires 3a, 3b, and 3c. Thus, a distance between wires increases when compared to the conventional wire harness 101. For this reason, it is possible to further reduce influence of noise generated in another adjacent wire. Accordingly, the wire harness 1 of the present embodiment can sufficiently reduce radiated noise of the wire portion 2. As a result, the wire harness 1 can suitably suppress generation of a surge voltage.

In addition, in the wire harness 1 according to the first embodiment, the braided wire 6 is formed to collective surround the outer circumferential side of the wire portion 2 on the cross section of the wire harness 1 illustrated in FIG. 3, and to approach the side of the central axial line X1 from the segments B1, B2, and B3 connecting the center of gravity points of two wires adjacent to each other in the circumferential direction among the respective wires 3a, 3b, and 3c of the wire portion 2 between the two wires.

According to these configurations (configurations of items (1) and (3)), it is possible to shield more than half a portion, in which two wires adjacent to each other in the circumferential direction among the respective wires 3a, 3b, and 3c of the wire portion 2 directly face each other, by the braided wire 6. Therefore, it is possible to reduce capacitances c among the respective wires 3a, 3b, and 3c of the wire portion 2 nearly up to 0, and to reliably suppress occurrence of noise of the respective wires 3a, 3b, and 3c. Further, it is possible to reliably reduce influence of noise of an adjacent wire. In this way, it is possible to reliably reduce radiated noise of the wire portion 2. As a result, it is possible to more reliably suppress generation of a surge voltage.

In addition, in the wire harness 1 according to the first embodiment, the braided wire 6 is formed to approach up to the central axial line X1 from between two wires of the wire portion 2 adjacent to each other in the circumferential direction on the cross section of the wire harness 1 illustrated in FIG. 3, and surround the respective outer circumferential sides of the wires 3a, 3b, and 3c of the wire portion 2. According to this configuration, the respective wires 3a, 3b, and 3c of the wire portion 2 are separately coated with the braided wire 6, and thus the capacitances c among the respective wires 3a, 3b, and 3c of the wire portion 2 can be set to 0. In this way, it is possible to more reliably suppress occurrence of noise of the respective wires 3a, 3b, and 3c, and to shield influence of noise of an adjacent wire. As a result, it is possible to more reliably suppress generation of a surge voltage.

In addition, in the wire harness 1 according to the first embodiment, the braided wire 6 formed by weaving a metal thin wire in a mesh shape is used as the shield member. According to this configuration, the braided wire 6 is freely stretched due to the mesh shape of the thin wire. Thus, the wire portion 2 can be easily coated with the braided wire 6, and the wire harness 1 can retain a property of being easily bent.

Herein, in the wire harness 1 according to the first embodiment, the braided wire 6 is sandwiched among the respective wires 3a, 3b, and 3c of the wire portion 2, and the wires 3a, 3b, and 3c and the braided wire 6 are disposed to face each other along the circumferential direction. For this reason, a distance between the wires 3a, 3b, and 3c and the braided wire 6 becomes short, and thus noise easily occurs between the wires 3a, 3b, and 3c and the braided wire 6. On the other hand, in the wire harness 1 according to the present embodiment, the braided wire 6 is grounded, and thus noise can be released from the grounded braided wire 6. In addition, since an electrified area between the wires 3a, 3b, and 3c and the braided wire 6 increases, a capacitance c between the wires 3a, 3b, and 3c and the braided wire 6 increases, and noise easily passes between the wires 3a, 3b, and 3c and the braided wire 6. That is, noise occurring between the wires 3a, 3b, and 3c and the braided wire 6 can be more easily absorbed by the braided wire 6. In this way, it is possible to further reduce radiated noise of the wire portion 2, and to further suppress generation of a surge voltage.

Second Embodiment

A description will be given of a second embodiment with reference to FIG. 4. FIG. 4 is an axial sectional view of a wire harness according to the second embodiment.

As illustrated in FIG. 4, a wire harness 11 of the second embodiment is different from the wire harness 1 of the first embodiment in cross-sectional shapes of respective wires 13a, 13b, and 13c of a wire portion 12 and a configuration of coating the wire portion 12 of a braided wire 16.

As illustrated in FIG. 4, the three respective wires 13a, 13b, and 13c of the wire portion 12 correspond to unshielded wires, and include conductors 14a, 14b, and 14c having rectangular cross sections and insulators 15a, 15b, and 15c formed by coating outer circumferences of the conductors 14a, 14b, and 14c. That is, the wires 13a, 13b, and 13c have substantially rectangular shapes on a cross section (axial cross section) of the wire harness 11 when viewed from an axial direction along a central axial line X1 illustrated in FIG. 4. The respective wires 13a, 13b, and 13c are radially disposed such that long sides of the rectangular shapes extended outward from the central axial line X1, and are evenly disposed along a circumferential direction around the central axial line X1. Materials, properties, and the like of the conductors 14a, 14b, and 14c and the insulators 15a, 15b, and 15c are similar to those of the conductors 4a, 4b, and 4c and the insulators 5a, 5b, and 5c of the first embodiment. A material, a property, and the like of the braided wire 16 are similar to those of the braided wire 6 of the first embodiment.

As illustrated in the axial cross section of FIG. 4, similarly to the wire harness 1 of the first embodiment, the wire harness 11 of the second embodiment adopts a configuration in which the three wires 13a, 13b, and 13c of the wire portion 12 and the braided wire 16 are alternately disposed along the circumferential direction around the central axial line X1 of the wire portion 12 on the cross section of the wire harness 11 when viewed from the axial direction along the central axial line X1 of the wire portion 12.

That is, the three wires 13a, 13b, and 13c of the wire portion 12 and the braided wire 16 are disposed such that the braided wire 16 is interposed between two wires of the wire portion 12 adjacent to each other along the circumferential direction around the central axial line X1 of the wire portion 12 on the cross section of the wire harness 11 when viewed from the axial direction along the central axial line X1 of the wire portion 12 on a side of the central axial line X1 from outer circumferential-side tangents C1, C2, and C3 connecting the conductors 14a, 14b, and 14c of the two wires. Specifically, the braided wire 16 approaches the side of the central axial line X1 from the outer circumferential-side tangent C1 that touches the conductor 14a of the wire 13a and the conductor 14b of the wire 13b at the same time from the outer circumferential side between the wire 13a and the wire 13b of the wire portion 12 adjacent to each other in the circumferential direction. Similarly, the braided wire 16 approaches the side of the central axial line X1 from the outer circumferential-side tangent C2 that touches the conductor 14b of the wire 13b and the conductor 14c of the wire 13c at the same time from the outer circumferential side between the wire 13b and the wire 13c of the wire portion 12 adjacent to each other in the circumferential direction. Similarly, the braided wire 16 approaches the side of the central axial line X1 from the outer circumferential-side tangent C3 that touches the conductor 14c of the wire 13c and the conductor 14a of the wire 13a at the same time from the outer circumferential side between the wire 13c and the wire 13a of the wire portion 12 adjacent to each other in the circumferential direction.

Accordingly, similarly to the wire harness 1 of the first embodiment, the wire harness 11 of the second embodiment can sufficiently reduce radiated noise of the wire portion 12. As a result, it is possible to suitably suppress generation of a surge voltage.

In addition, referring to the wire harness 11 of the second embodiment, on the cross section of the wire harness 11 illustrated in FIG. 4, the braided wire 16 is formed (1)' to collectively surround the outer circumferential side of the wire portion 12, and (4) along an outer short side corresponding to one of two short sides of a rectangular shape of each of the wires 13a, 13b, and 13c and two long sides of the rectangular shape.

According to configurations of the items (1)' and (4), a long side portion of the rectangular shape corresponding to a substantially whole region of a portion, in which two wires adjacent to each other in the circumferential direction among the wires 13a, 13b, and 13c of the wire portion 12 directly face each other, can be shielded by the braided wire 16. Thus, it is possible to more effectively suppress occurrence of noise of the respective wires 13a, 13b, and 13c and reduce influence of noise of adjacent wires. In this way, it is possible to further reduce radiated noise of the wire portion 12. As a result, it is possible to further suppress generation of a surge voltage.

In addition, in the wire harness 11 of the second embodiment, similarly to the wire harness 1 of the first embodiment, the braided wire 16 is used as a shield member, and the braided wire 16 is grounded. Here, as illustrated in FIG. 4, axial cross sections of the respective wires 13a, 13b, and 13c of the wire portion 12 correspond to rectangular shapes. Further, the wires 13a, 13b, and 13c are radially disposed such that long sides of the rectangular shapes extended outward from the central axial line X1, and are evenly disposed along the circumferential direction. According to this configuration of the wires 13a, 13b, and 13c, it is possible to further increase an electrified area between the wires 13a, 13b, and 13c and the braided wire 16, and to allow noise to more easily pass between the wires 13a, 13b, and 13c and the braided wire 16. Thus, noise occurring between the wires 13a, 13b, and 13c and the braided wire 16 can be more easily absorbed by the braided wire 16. In this way, it is possible to further reduce radiated noise of the wire portion 12, and to further suppress generation of a surge voltage.

Furthermore, in the wire harness 11 of the second embodiment, as illustrated in FIG. 4, the three wires 13a, 13b, and 13c of the wire portion 12 are radially disposed and are substantially evenly disposed in the circumferential direction, and thus short sides on a side of the central axial line X1 among shorts sides of the rectangular shapes of the respective wires 13a, 13b, and 13c have a positional relation in which the short sides do not face one another. That is, as indicated by a dotted line in FIG. 4, a width of a region in which short sides of adjacent wires directly face each other decreases when compared to a case in which short sides of the wires face each other. In this way, an electrified area between adjacent wires of the wire portion 12 can be reduced. Thus, it is possible to further reduce capacitances c among the respective wires 13a, 13b, and 13c of the wire portion 12, and to further suppress occurrence of noise of the respective wires 13a, 13b, and 13c.

Embodiments of the present invention have been described. However, the embodiments are presented as examples, and are not intended to restrict the scope of the present invention. The embodiments can be implemented in various other forms, and can be omitted, replaced, and changed in various manners within a range of a subject matter of the present invention. The embodiments and changed forms thereof are included in the scope and the subject matter of the present invention and are included in the present invention described in the claims and equivalents thereof.

In the above embodiments, the inverter 20 and the motor 30 are given as examples of two elements to which the wire harnesses 1 and 11 according to the embodiments are connected. However, the wire harnesses 1 and 11 can be applied to between two other elements when a surge voltage may be generated between the two elements.

In addition, the above embodiments give an example of a configuration in which the wire harnesses 1 and 11 according to the embodiments are used as power supply lines for connecting the inverter 20 and the motor 30 corresponding to the three-phase AC type. However, the inverter 20 and the motor 30 may correspond to other types than the three-phase AC type. That is, for example, the wire harnesses 1 and 11 according to the embodiments may correspond to four-phase wiring rather than three-phase wiring, and each of the wire portions 2 and 12 may have three or more wires.

Further, in the above embodiments, the braided wires 6 and 16 are given as examples of the shield member that suppresses noise. However, for example, a metal tape or foil of copper, aluminum, and the like may be applied to the shield member, and the shield member may be configured by combining the metal tape or foil with the braided wires 6 and 16.

Furthermore, the above embodiments give an example of a configuration in which the braided wires 6 and 16 serving as the shield member are formed in tubular shapes and respective wires of each of the wire portions 2 and 12 are collectively surrounded. However, the braided wires 6 and 16 may have other configurations when the braided wires 6 and 16 can shield between wires adjacent to each other in the circumferential direction. For example, the shield member may be configured by a plurality of plate-shaped braided wires, and each of the braided wires may be disposed between wires. In this case, the respective braided wires included in the shield member may not be connected to each other.

In addition, respective wires of the wire portions 2 and 12 may correspond to a coaxial cable. That is, it is possible to employ a configuration in which a shield member is separately provided for each wire around a conductor of each wire and between the conductor and a coated portion. Further, respective wires of the wire portions 2 and 12 may be extended in the same direction along the central axial line X1 and may not be evenly disposed along the circumferential direction around the central axial line X1 unlike the above embodiment.

Furthermore, the above embodiments give an example of a configuration in which the braided wires 6 and 16 serving as the shield member are grounded. However, the braided wires 6 and 16 may not be grounded.

A wire harness according to the present invention can shield at least a part of a portion, in which two wires adjacent to each other in a circumferential direction among wires of a wire portion directly face each other, using a shield member by interposing the shield member between the two wires, and thus can sufficiently reduce radiated noise of the wire portion. As a result, there is an effect in that a surge voltage can be suitably suppressed.

Although the present invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
a wire portion formed by arranging three or more wires each of the wires having a conductor in the same direction and an insulator coating an outer circumference of the conductor; and
a shield member, wherein
the three or more wires of the wire portion and the shield member are disposed such that the shield member is interposed between two wires of the wire portion adjacent to each other along a circumferential direction around a central axial line of the wire portion on a cross section of the wire harness when viewed from an axial direction along the central axial line, on a side of the central axial line from an outer circumferential-side tangent connecting the conductors of the two wires,
the three or more wires are circumferentially spaced from each other in the circumferential direction and a center of each wire is radially offset from the central axial line, and
the shield member is sandwiched between the respective wires.

2. The wire harness according to claim 1, wherein the shield member is a braided wire formed by weaving a metal thin wire in a mesh shape.

3. The wire harness according to claim 2, wherein the shield member is grounded.

4. The wire harness according to claim 2, wherein the wires of the wire portion have circular shapes on the cross section and are evenly disposed along the circumferential direction, and the shield member is formed to collectively surround an outer circumferential side of the wire portion on the cross section, and approach the side of the central axial line from a segment connecting center of gravity points of two wires of the wire portion adjacent to each other in the circumferential direction between the two wires.

5. The wire harness according to claim 2, wherein
the wires of the wire portion have rectangular shapes on the cross section, the wires being disposed such that long sides of the rectangular shapes extend outward from the central axial line and being evenly disposed along the circumferential direction, and
the shield member is formed to collectively surround an outer circumferential side of the wire portion on the cross section, and is formed along an outer short side corresponding to one of two short sides of the rectangular shape of each of the wires and two long sides of the rectangular shape.

6. The wire harness according to claim 1, wherein
the shield member is grounded.

7. The wire harness according to claim 6, wherein
the wires of the wire portion have circular shapes on the cross section and are evenly disposed along the circumferential direction, and
the shield member is formed to collectively surround an outer circumferential side of the wire portion on the cross section, and approach the side of the central axial line from a segment connecting center of gravity points of two wires of the wire portion adjacent to each other in the circumferential direction between the two wires.

8. The wire harness according to claim 6, wherein
the wires of the wire portion have rectangular shapes on the cross section, the wires being disposed such that long sides of the rectangular shapes extend outward from the central axial line and being evenly disposed along the circumferential direction, and
the shield member is formed to collectively surround an outer circumferential side of the wire portion on the cross section, and is formed along an outer short side corresponding to one of two short side of the rectangular shape of each of the wires and two long sides of the rectangular shape.

9. The wire harness according to claim 1, wherein
the wires of the wire portion have circular shapes on the cross section and are evenly disposed along the circumferential direction, and
the shield member is formed to collectively surround an outer circumferential side of the wire portion on the cross section, and approach the side of the central axial line from a segment connecting center of gravity points of two wires of the wire portion adjacent to each other in the circumferential direction between the two wires.

10. The wire harness according to claim 9, wherein
the shield member is formed to approach up to the central axial line from between the two wires on the cross section, and surround respective outer circumferential sides of the wires of the wire portion.

11. The wire harness according to claim 1, wherein
the wires of the wire portion have rectangular shapes on the cross section, the wires being disposed such that long sides of the rectangular shapes extend outward from the central axial line and being evenly disposed along the circumferential direction, and
the shield member is formed to collectively surround an outer circumferential side of the wire portion on the cross section, and is formed along an outer short side corresponding to one of two short sides of the rectangular shape of each of the wires and two long sides of the rectangular shape.

* * * * *